(12) United States Patent
Kramer et al.

(10) Patent No.: US 8,462,310 B2
(45) Date of Patent: Jun. 11, 2013

(54) BISTABLE LIQUID CRYSTAL ELEMENT

(75) Inventors: Laura Lynn Kramer, Corvallis, OR (US); David Sikharulidze, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1138 days.

(21) Appl. No.: 12/251,043

(22) Filed: Oct. 14, 2008

(65) Prior Publication Data

US 2010/0091208 A1   Apr. 15, 2010

(51) Int. Cl.
*C09K 19/52* (2006.01)

(52) U.S. Cl.
USPC .............................. 349/163; 349/33; 349/141

(58) Field of Classification Search
None
See application file for complete search history.

(56) References Cited

U.S. PATENT DOCUMENTS

| | | | |
|---|---|---|---|
| 4,128,313 | A | 12/1978 | Cole, Jr. et al. |
| 6,970,211 | B2 | 11/2005 | Sikharulidze |
| 7,115,307 | B2 | 10/2006 | Dubois et al. |
| 7,167,155 | B1 | 1/2007 | Albert et al. |
| 2003/0210375 | A1 | 11/2003 | Sikharulidze |
| 2004/0144953 | A1 | 7/2004 | Sikharulidze |
| 2005/0094073 | A1 | 5/2005 | Sikharulidze |
| 2005/0094087 | A1 | 5/2005 | Sikharulidze |
| 2005/0206831 | A1 | 9/2005 | Sikharulidze |
| 2005/0243264 | A1 | 11/2005 | Sikharulidze |
| 2006/0170848 | A1 | 8/2006 | Kawai et al. |
| 2006/0232731 | A1 | 10/2006 | Sikharulidze |

FOREIGN PATENT DOCUMENTS

WO   WO2006048620   5/2006

*Primary Examiner* — Richard Kim

(57) ABSTRACT

A nematic bistable liquid crystal (LC) display element includes a substrate having an inner surface alignment layer and a pair of in-plane electrodes in proximity to the substrates. The display element has charged electrophoretic nanoparticles in the LC medium configured to setup a matrix with the LC when an electric field is applied to the electrodes.

10 Claims, 8 Drawing Sheets

A bistable display element in a liquid crystal (LC) display
BISTABLE LIQUID CRYSTAL ELEMENT

CROSS REFERENCE TO RELATED APPLICATIONS

This application claims the benefit of U.S. Provisional Application Ser. No. 61/023,243, filed Jan. 24, 2008, titled "Bistable Liquid Crystal Element" which is hereby incorporated by reference herein as if reproduced in full below.

BACKGROUND

A bistable display element in a liquid crystal (LC) display system using electrophoretic particles remains in a predetermined cell state for a period of time without the need for power. The degree of bistability may be controlled by chemical or electrical modification of the suspended electrophoretic particles. Nematic LC molecules are oriented in substantially parallel lines in a mesomorphic phase. Existing bistable LC display elements typically have fixed alignment on at least one interior surface and a switching alignment on the other interior surface of a display element.

Before an electric field is applied to an LC display element, the orientation of the liquid crystal molecules is determined by the alignment on the interior surfaces or alignment layers of the LC cell. Alignment layers can separate the LC from the electrodes or glass substrate and give a preferred direction of orientation for the LC molecules. Nematics have fluidity similar to that of ordinary (isotropic) liquids but they can be easily aligned by an external magnetic or electric field. An aligned nematic has the optical properties of a uniaxial crystal and this makes them extremely useful in LC displays.

Prior systems may have applied microstructure gratings on both interior surfaces of their bistable devices. Driving this type of device can be complicated, and the construction of the microstructures can be a manufacturing challenge. Other bistable display element configurations rely on polarizers for their optical effect and only have microstructure on one interior surface of the device. As such, it has been difficult to achieve full horizontal to vertical switching of the LC molecules.

DETAILED DESCRIPTION OF EXAMPLE EMBODIMENTS

Figure 1:
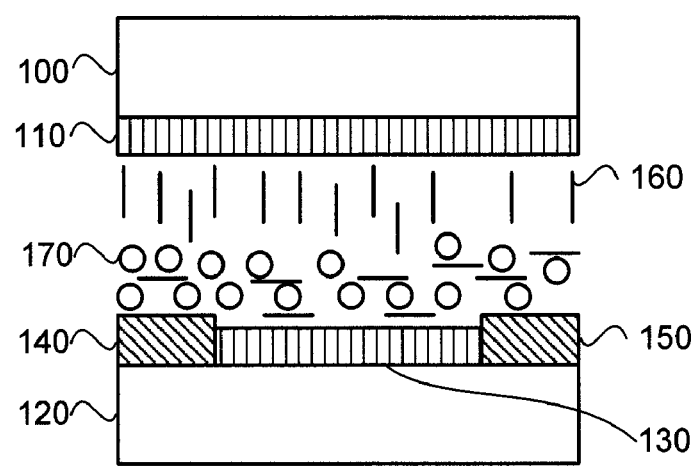
FIG. 1 is a cross section view of a bistable LC display element embodiment including a first and a second in-plane electrode.

In describing embodiments of the present invention, the following terminology will be used.

The singular forms "a," "an," and "the" include plural referents unless the context clearly dictates otherwise. Thus, for example, reference to "a device" includes reference to one or more of such devices.

As used herein, the term "about" means that dimensions, sizes, formulations, parameters, shapes and other quantities and characteristics are not and need not be exact, but may be approximated and/or larger or smaller, as desired, reflecting tolerances, conversion factors, rounding off, measurement error and the like and other factors known to those of skill in the art.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Reference will now be made to the exemplary embodiments illustrated, and specific language will be used herein to describe the same. It will nevertheless be understood that no limitation of the scope of the invention is thereby intended.

Electrophoretically controlled nematic (EPCN) displays may be characterized by the interaction of nanoparticles in a suspension with LC (Liquid Crystal) molecules located between two opposing electrodes. Charged nanoparticles electrophoretically migrate between electrodes under the influence of an applied electric field in order to set up a nanoparticle network or stabilization area that changes the orientation and stabilizes the alignment of the LC molecules. When nanoparticles disrupt the effect of the alignment layers on the LC molecules, then the layers no longer influence alignment of the LC. The LC is stabilized in an orientation or stabilized in a network of the nanoparticles even after the voltage potential across the electrodes is removed. Because of the small size of the nanoparticles, the observed optical effect is achieved through the change in orientation of dichroic dye in suspension with the LC. Alternatively, the optical effects created by this system can also be viewed through polarization layers where polarization layers are desired to be used.

In-plane electrodes may be incorporated into an electrophoretically controlled LC (EPCN) device to create effective planar and homeotropic states through the use of charged nanoparticles. In-plane electrodes create electric fields in a plane parallel with the substrates of a display element. On the other hand 'vertical electrodes' set up electric fields which are orthogonal to the alignment layers and substrates of a display element. Vertical electrodes may also be used in certain embodiments in addition to the in-plane electrodes, as discussed later. Vertical electrodes may be used to stabilize the LC alignment. However, vertical electrodes associated with the substrate of a display element may create an optical challenge if the electrodes are not substantially transparent. Therefore, embodiments using in-plane electrodes can have an optical advantage while still locking-in nanoparticle alignment. In the present disclosure, the term 'electrode' refers specifically to in-plane electrodes unless otherwise specified Dichroic dye may be added to a LC composition. Dichroic dye exhibits an absorbed color when viewed along a defined axis such as a planar alignment. A dichroic dye is an assymetrical molecule which absorbs a particular color along one axis and is fairly transparent (has very little absorption) along the other axis. The assymetrical molecule tends to align with LC molecules and can be rotated when the LC molecules are rotated to create two optical states. This disclosure provides a display element design that can allow switching LC orientations from substantially homeotropic to substantially planar alignments for dichroic dye embodiments.

FIG. 1 is a cross sectional depiction of a bistable liquid crystal (LC) display element embodiment comprising a substrate 100 having an inner surface alignment layer 110 and an opposing substrate 120 having an inner surface alignment layer 130. LC alignment may be set through molecular interaction between the LC and the molecular structure of the inner surface of the substrate or the alignment layer. The molecular structure of the alignment layer may be set by a grating structure, a chemical composition and/or through a mechanical process known in the art as 'rubbing'.

A display element may be defined as a region located between a pair of in-plane electrodes and bordered by layers which physically confine a LC medium. A first in-plane electrode 140 and a second in-plane electrode 150 border the alignment layer 130. An LC medium comprising nematic liquid crystal 160 and charged electrophoretic nanoparticles 170 is disposed between the alignment layers and the electrodes. The term in-plane electrode is defined herein to mean that the electrodes are in the same plane as the cell gap containing the LC medium 160 and electrophoretic nanoparticles 170. The electrophoretic nanoparticles may comprise up to approximately 10% of the LC medium and may be comprised of silica, titania, alumina, or of any combination thereof. An example size range for the nanoparticles may include, but is not limited to, 5-50 nanometers.

An LC medium may be confined by glass plate substrates, plastic substrates or alignment layers, and semi-transparent electrodes. Polymer beads approximately up to 10 microns in size may be embedded in the LC to act as mechanical spacers between a substrate and an opposing substrate. The LC medium may further comprise a dichroic dye which will be discussed in more detail later. This disclosure provides a display element design that can allow switching LC orientations from substantially homeotropic to substantially planar alignments, which is useful for dichroic dye embodiments.

Figure 2:
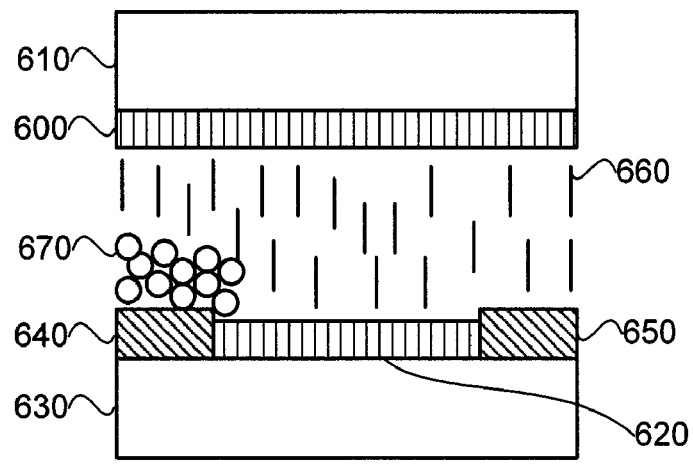
FIG. 2 depicts an embodiment of a bistable LC display element after applying a voltage between the first in-plane electrode and the second in-plane electrode.

In accordance with an embodiment, FIG. 2 depicts a bistable display element after applying a voltage between the first in-plane electrode 640 and second in-plane electrode 650. An alignment layer 620 borders the in-plane electrodes and can be disposed on a substrate 630. For example, one or more voltage pulses of about 1 to 500 milliseconds in duration and about 5 to 100 volts may collect the electrophoretically charged nanoparticles 670 at the first in-plane electrode as depicted. The voltage pulses have a cumulative effect sufficient to remove the nanoparticles from positions in a nanoparticle network or stabilization area with the LC to an in-plane electrode. The LC 660 on the alignment layer 600 disposed on the substrate 610 remains unaffected by the collecting of nanoparticles from between the in-plane electrodes.

Figure 3:
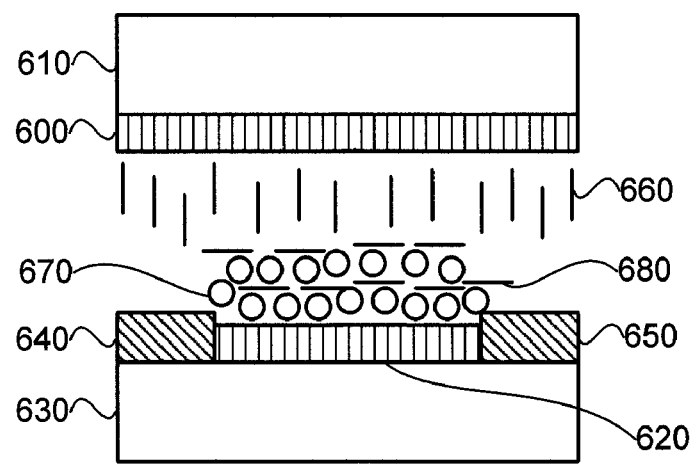
FIG. 3 depicts spreading the charged electrophoretic nanoparticles between the in-plane electrodes in accordance with the embodiment of FIG. 2.

FIG. 3 depicts spreading the charged electrophoretic nanoparticles 670 between the in-plane electrodes in an embodiment. Applying a second voltage pulse of about 1 to 500 milliseconds duration and about 5 to 100 volts negative amplitude between the first in-plane electrode 640 and second in-plane electrode 650 can set up an immobilization area or network of the nanoparticles for aligning the LC. The electrophoretic nanoparticles 670 stabilized with the LC molecules 680 thus stabilizing the LC even in the absence of the applied voltage. The collecting voltage may have a longer time period than the time period of the voltage needed for spreading the charged nanoparticles between the in-plane electrodes. Otherwise the nanoparticles would simply collect on an opposing electrode and there would be no network of the nanoparticles.

Figure 4:
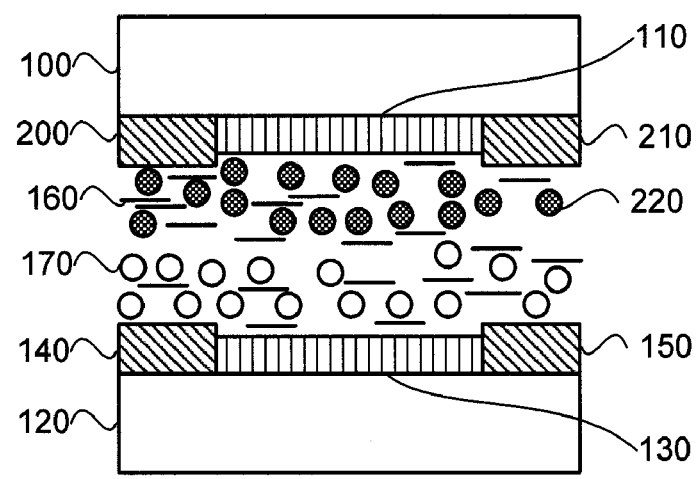
FIG. 4 is a cross section view of a second bistable LC display element embodiment including a third in-plane electrode and a fourth in-plane electrode.

FIG. 4 is a cross sectional depiction of another bistable liquid crystal display element embodiment further including a third in-plane electrode 200 and a fourth in-plane electrode 210 bordering the alignment layer 110. Additional electrophoretic nanoparticles 220 can carry a charge opposite to the charged electrophoretic nanoparticles 170. The third and fourth in-plane electrodes may be used to attract and spread the oppositely charged nanoparticles under the influence of a variable electric field. The first pair of in-plane electrodes 140 and 150 may be used to attract and disperse the charged nanoparticles 170. All other elements are similar to those depicted in FIG. 1.

Nanoparticles disrupt the effect of the alignment layers interior to the display element, so that the alignment layers no longer significantly influence the LC. Thus, the LC is stabilized in the nanoparticle network in a desired orientation even in the absence of an electric field.

The embodiment of FIG. 4 has been illustrated as orienting the third in-plane electrode and fourth in-plane electrode directly over the first and second in-plane electrodes. However, either pair of the electrodes may be rotated 90 degrees in the same plane with respect the other pair of electrodes, and thus each separate group of nanoparticles can move in perpendicular directions with respect to each other in the same plane within the display element.

Figure 5:
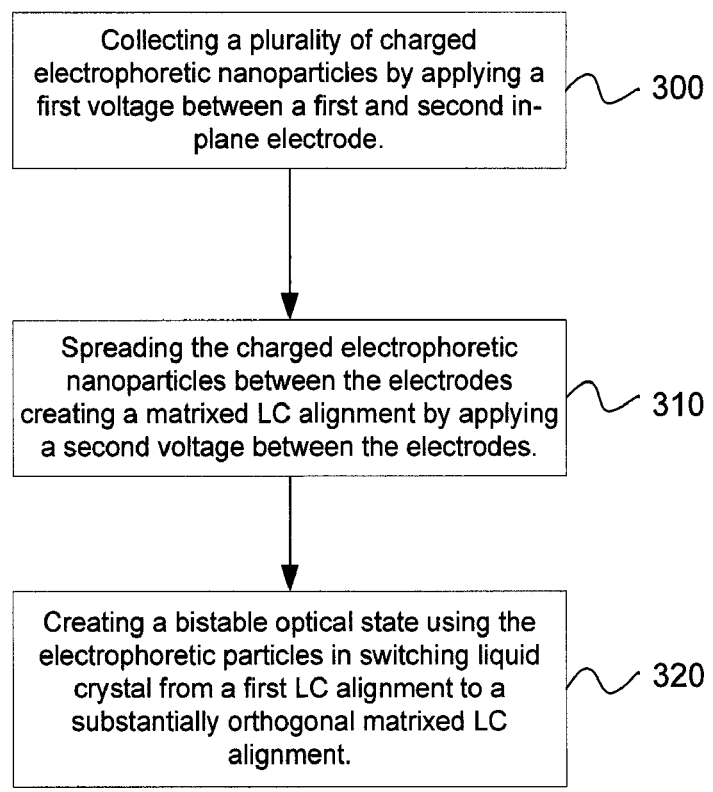
FIG. 5 is a flow chart depicting a method of an embodiment for changing a state of a bistable LC display element.

FIG. 5 is a flow chart depicting an embodiment of a method for changing a state of a bistable LC display element. A plurality of charged electrophoretic nanoparticles can be collected by applying a first voltage between a first and second in-plane electrode, as in block 300. The charged electrophoretic nanoparticles can then be spread or dispersed between the in-plane electrodes to create a stabilized LC alignment by applying a second voltage to the in-plane electrodes, as in block 310.

The polarity of the second voltage is opposite to the polarity of the first voltage. The applied voltages described herein have predetermined time periods and are therefore interchangeably referred to as voltage pulses or simply voltages. The duration or magnitude of the second voltage may be less than the first voltage so that the nanoparticles do not simply collect on an opposing in-plane electrode but disperse or spread between electrodes. The electrophoretic nanoparticles are stabilized with the LC molecules, thus locking in the LC even in the absence of the applied voltage. Another operation is creating a bistable cell state using the electrophoretic particles by switching the LC from a first LC alignment to a substantially orthogonal stabilized LC alignment as in block 320. This operation is accomplished by pulling the nanoparticles out of the alignment layer and viewable area (or cell gap containing LC) and onto the in-plane electrode with an electric field. The LC alignment is then determined by the alignment layers on the substrate surfaces.

In another embodiment, the method further includes an operation for collecting oppositely charged electrophoretic nanoparticles by applying of a voltage between a third and fourth in-plane electrode. The oppositely charged electrophoretic nanoparticles are spread over an alignment layer creating a nanoparticle network or immobilization area by application of a second voltage between the in-plane electrodes as described previously. The collection of the oppositely charged nanoparticles may occur simultaneously with the collection of the charged nanoparticles or it may occur sequentially.

Figure 6:
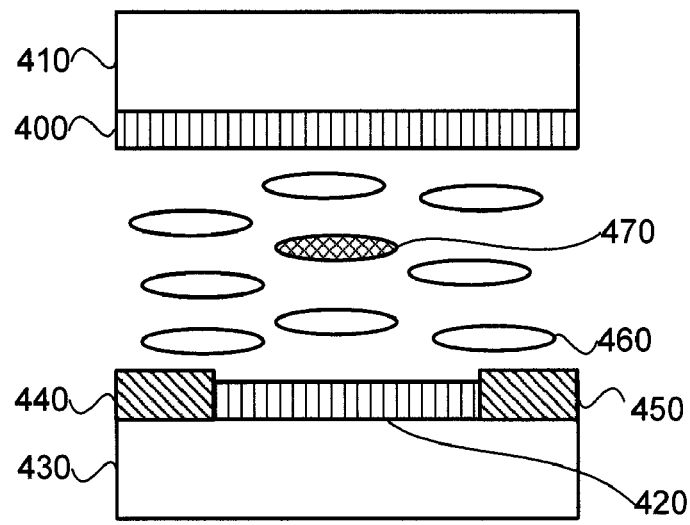
FIG. 6 depicts an embodiment of a dichroic dye disposed in a bistable LC display element.

FIG. 6 depicts the addition of a dichroic dye to the LC display element in accordance with the disclosure. Adding dichroic dye to a LC display element may be easier to manufacture and control than adding polarizing layers. The major advantage of eliminating polarizers is the increased optical efficiency of the device (e.g., improved performance in a reflective application). Polarizers absorb 50% of the incident light which make them very difficult to use in reflective applications that do not use backlighting, and virtually impossible to use in a stacked color pixel architecture. FIG. 6 is similar to the bistable LC display element of FIG. 1 where substrates 410 and 430 have adjacent alignment layers 400 and 420 respectively. Dichroic dye molecules 470 in the LC medium with the LC molecules 460 absorb colored light in the substantially planar alignment depicted. Colored light frequencies can be selected for the display element depending on the dichroic dye type used in the LC medium.

Figure 7:
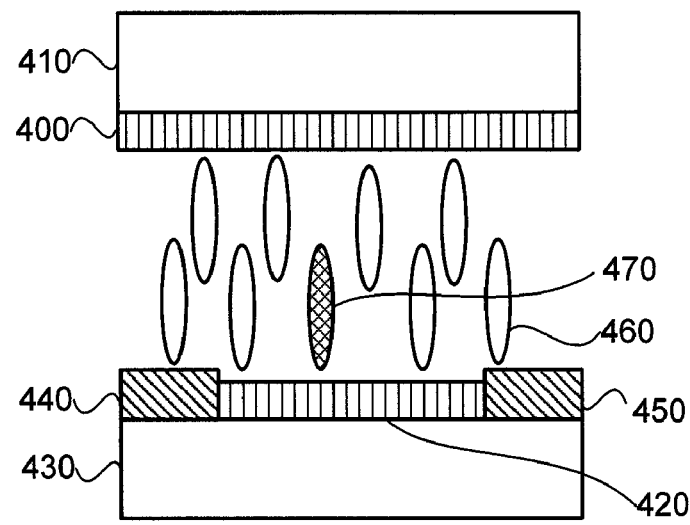
FIG. 7 depicts an embodiment of dichroic dye molecules stabilized with LC molecules configured to transmit light in a substantially homeotropic alignment.

In FIG. 7, the dichroic dye molecules 470 are moved to a substantially homeotropic alignment with the LC molecules 460 which are also homeotropically aligned and thus no color is apparent to a viewer. All other elements are similar to the elements of FIG. 4. The nanoparticles (not depicted here but see FIG. 1) near the alignment layers in this embodiment enable the substantially planar and homeotropic alignments that provide optical color absorption or relative transparency for dichroic dyes.

Figure 8:
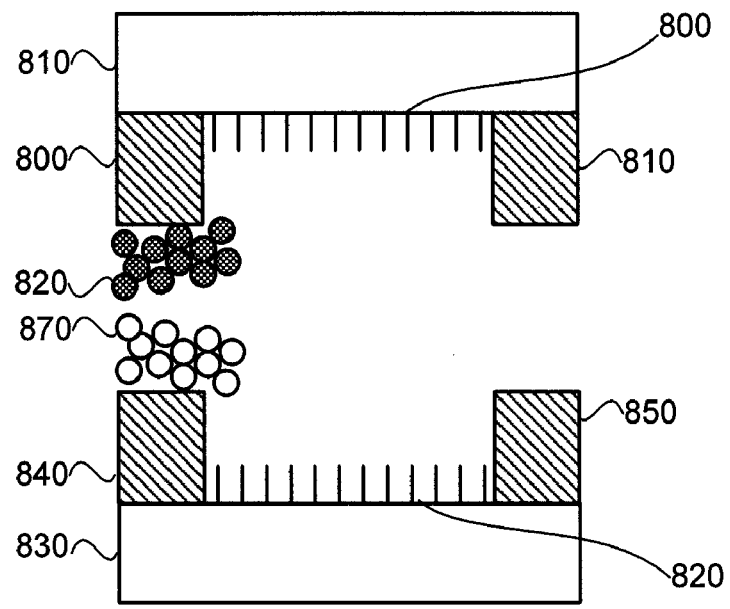
FIG. 8 depicts controlling two sets of nanoparticles independently using two in-plane electrode pairs in accordance with an embodiment.

FIG. 8 depicts controlling two sets of nanoparticles in an embodiment. This control may result in part from applying at least one voltage pulse across the in-plane electrodes 800 and 810 where the collecting voltage may be approximately 5 to 100 negative volts of about 1 to 50 milliseconds duration. Applied voltage pulses collect oppositely charged electrophoretic nanoparticles 820 on the in-plane electrode 800. A similar but independently applied voltage pulse of an opposite polarity collects the charged electrophoretic nanoparticles 870 on in-plane electrode 840. LC aligns on the substrate inner surface 802 and 820 according to alignment layers on the inner surfaces 802 and 820 on the substrates 804 and 830 respectively.

Figure 9:
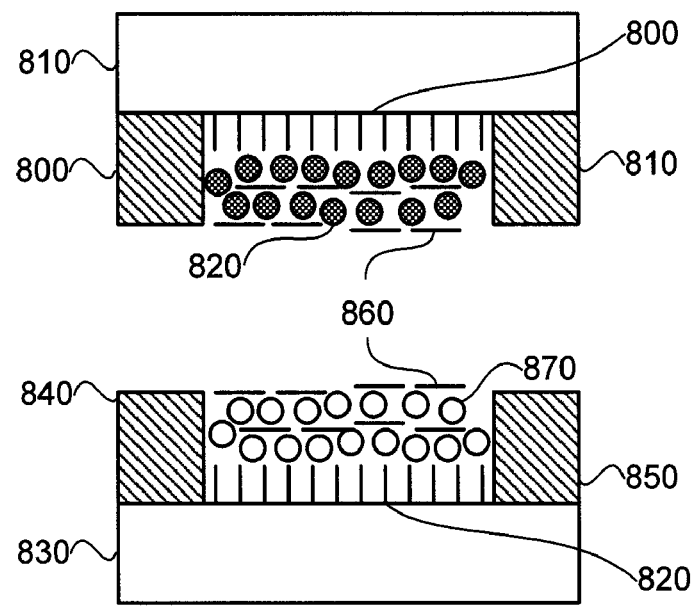
FIG. 9 depicts the bistable LC display element of FIG. 8 after the application of the spreading voltage.

FIG. 9 depicts the bistable LC display element of FIG. 8 after the application of at least one spreading voltage pulse across in-plane electrodes 840 and 850. Equal but opposite amplitude pulses are applied across in-plane electrodes 800 and 810. The applied voltage pulses draw the oppositely charged electrophoretic nanoparticles 820 from in-plane electrode 800 across the surface alignment 802. The similar but independently applied voltage pulse draws the charged electrophoretic nanoparticles 870 from in-plane electrode 840 across the surface alignment 820. The LC 860 can be separated from surface alignment layers 802 and 820 by the nanoparticles 870 and 820 with and also be stabilized by the nanoparticles. The stabilized LC can be locked in an alignment set by the applied voltages even in the absence of the voltages and despite the attraction of an inner surface alignment layer.

In an alternate embodiment, a LC is used in the medium between display element alignment layers. When the nanoparticles are collected or pulled to the in-plane electrodes, the LC alignment is determined by surface treatment on the display element alignment layers as explained above. However, the alignment layers may have a planar alignment of the LC in the absence of the nanoparticles. When the nanoparticles are spread between in-plane electrodes by an applied voltage, nanoparticles of both charge polarities are stabilized with the LC. The LC that is shielded from the display element alignment layers by the nanoparticle network or immobilization area created by nanoparticles and LC may have a homeotropic alignment.

Figure 10:
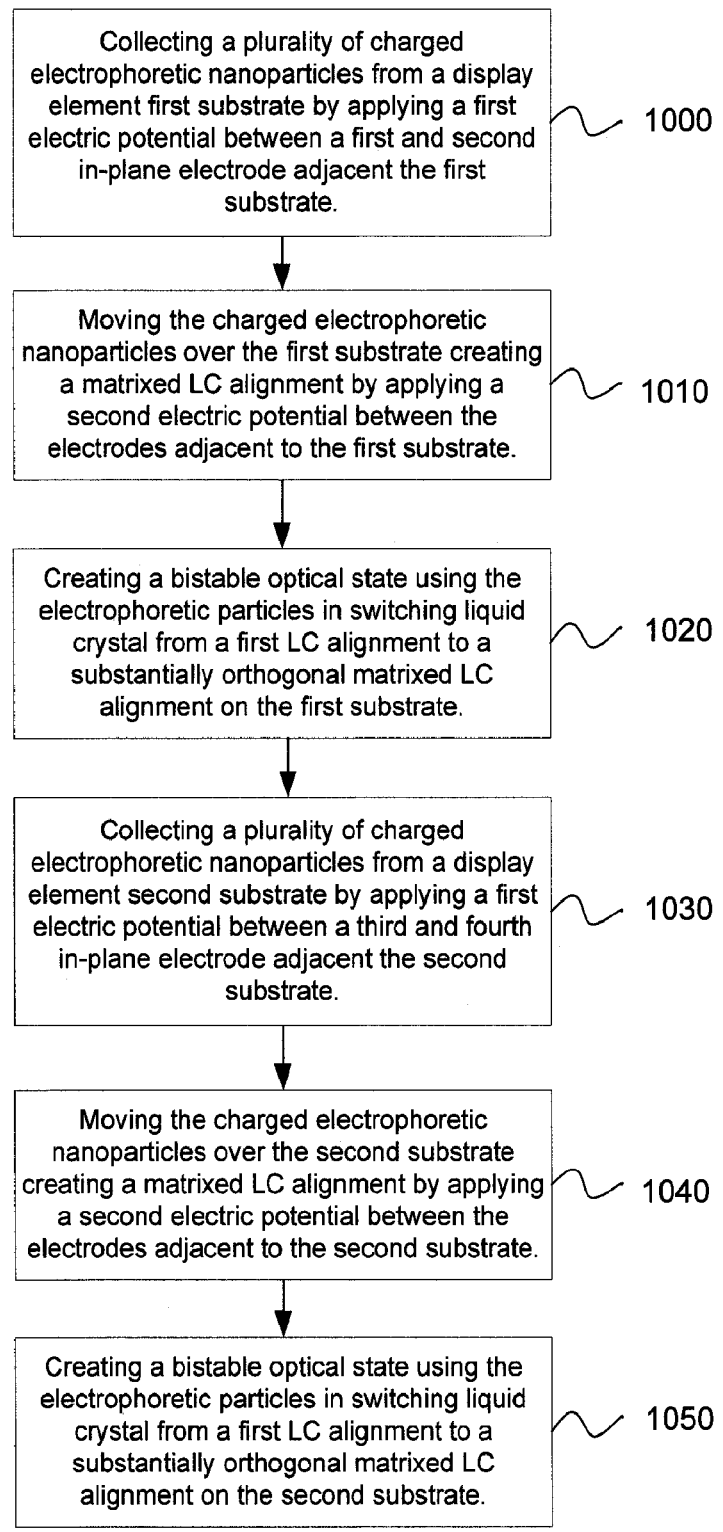
FIG. 10 is a flow chart depicting a method in accordance with an embodiment for changing state of a bistable LC display element having two in-plane electrode pairs.

FIG. 10 is a flow chart depicting a method in an embodiment for changing a state of a bistable liquid crystal (LC) display element having two in-plane electrode pairs. Charged electrophoretic nanoparticles may be collected from a first substrate by applying a first electric potential between a first and second electrode adjacent the first substrate as in step 1000. The charged electrophoretic nanoparticles may be moved across the first display element substrate thereby creating a stabilized LC alignment by applying a second electric potential between the in-plane electrodes as in step 1010. A bistable cell state may be created using the electrophoretic particles by switching liquid crystal from a first LC alignment to a substantially orthogonally stabilized LC alignment as in step 1020.

The method can further include collecting charged electrophoretic nanoparticles collected from a second substrate by applying a first electric potential between a third and fourth in-plane electrode adjacent the second substrate as in step 1030. The charged electrophoretic nanoparticles may be moved across the second display element substrate thereby creating a stabilized LC alignment by applying a second electric potential between the electrodes as in step 1040. A bistable cell state may be created using the electrophoretic particles by switching liquid crystal from a first LC alignment to a substantially orthogonal stabilized LC alignment on the second substrate as in step 1050.

Figure 11:
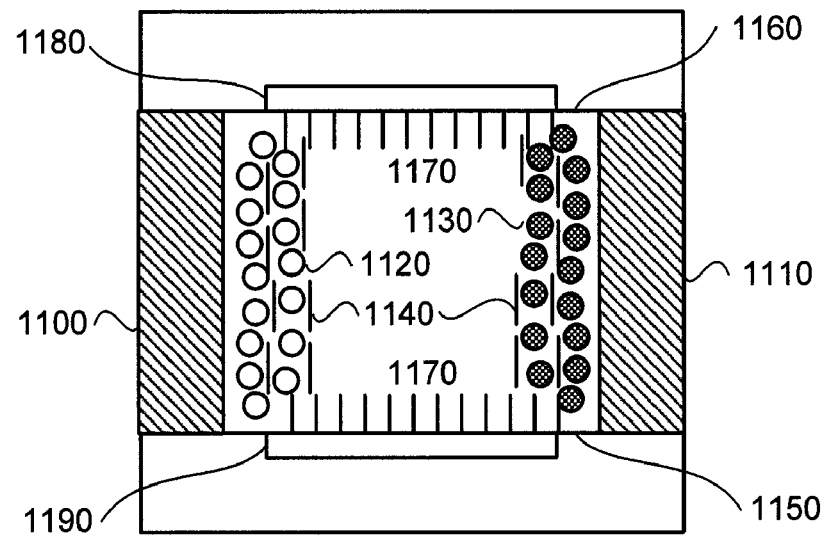
FIG. 11 depicts an embodiment where in-plane electrodes act as display element spacers.

FIG. 11 depicts an embodiment where in-plane electrodes act as display element spacers. Electrodes 1100 and 1110 have a tall aspect ratio sufficient for collecting charged electrophoretic nanoparticles 1120 and 1130. A tall aspect ratio allows spreading of the nanoparticles on a single interior surface of an in-plane electrode. This depiction may result in part from applying differential voltage pulses across in-plane electrodes 1100 and 1110. A differential pulse may include an electrode at a negative voltage and another electrode at a positive voltage. The differential voltage pulses collect charged electrophoretic nanoparticles 1120 on the in-plane electrode 1100 and oppositely charged nanoparticles 1130 on the in-plane electrode 1110. LC 1140 is matrixed or stabilized with respective nanoparticles at respective electrodes. Substrate inner surfaces 1150 and 1160 align LC 1170 when the nanoparticles are not present. It is not necessary that a voltage be applied to the vertical in-plane electrodes 1180 and 1190 during the collecting of nanoparticles in FIG. 11.

Figure 12:
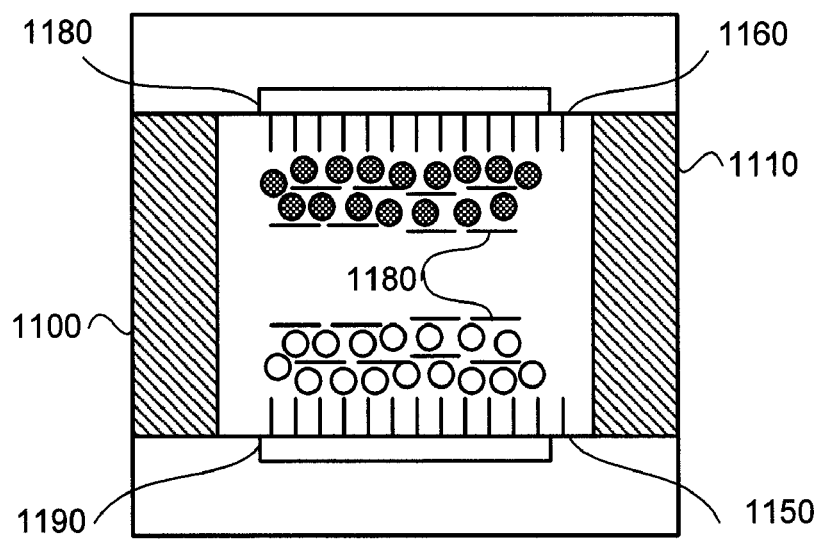
FIG. 12 depicts the bistable LC display element of FIG. 11 after the application of a differential voltage pulse.

FIG. 12 depicts the bistable LC display element of FIG. 11 after the application of a differential pulse. The differential voltage pulses draw the charged electrophoretic nanoparticles 1120 from the in-plane electrode 1100 across the substrate inner surface 1150 and the oppositely charged electrophoretic nanoparticles 1130 from the in-plane electrode 1110 across the substrate inner surface 1160. Voltage pulses may be applied between the vertical in-plane electrodes 1180 and 1190 to separate nanoparticles of like charges to a respective inner surface. In the embodiment of FIG. 12, the LC 1180 matrixed or stabilized with the nanoparticles are shielded from the inner surface alignment layers by nanoparticles so that even in the absence of an electric field the LC maintains alignment state.

Electrodes may be interdigitally configured on a substrate. In an embodiment, a first electrode is interdigited with a second electrode and spaced such that voltage potentials may be applied between the first electrode and the second in a plane adjacent the substrate. Similarly interdigited third and fourth electrodes bordering the opposing interface may also be interdigitally configured. A display element may then be bordered by at least two electrodes or by four electrodes or more. An alternative embodiment may comprise a uniform electrode adjacent to either the semi-transparent interface or to the opposing interface. A uniform electrode, as opposed to a line electrode may be a single conductive plate covering one of the substrates with a single point of contact.

The charges illustrated in present description for the nanoparticles and LC may be either positive or negative depending on the type of charges that are effective for a specific configuration. As explained, some embodiments may use particles with both charges and other embodiments may use elements with just one selected charge.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A bistable liquid crystal (LC) display element having an LC medium, comprising:
    a substrate having an inner surface alignment layer and an opposing substrate having an inner surface alignment layer;
    a first in-plane electrode and a second in-plane electrode in proximity to the substrate; and
    a plurality of electrophoretic nanoparticles in the LC medium having a charge polarity and configured to stabilize the LC when an electric field is applied to the first in-plane electrode and second in-plane electrode.

2. A bistable liquid crystal display element as in claim 1, further comprising:
    a third in-plane electrode and a fourth in-plane electrode in proximity to the opposing substrate; and
    a plurality of electrophoretic nanoparticles in the LC medium having a second charge polarity opposite to the first charge polarity and configured to stabilize the LC when an electric field is applied to the third and fourth in-plane electrodes.

3. A bistable liquid crystal display element as in claim 2, wherein the electrodes are vertical electrodes.

4. A bistable liquid crystal display element as in claim 1, wherein the LC medium further comprises at least one dichroic dye.

5. A bistable liquid crystal display element as in claim 1, wherein the electrophoretic nanoparticles are selected from the group consisting of silica, titania, alumina, and combinations thereof.

6. A bistable liquid crystal display element as in claim 5, further comprising a uniform electrode adjacent one of the substrate or the opposing substrate.

7. A bistable liquid crystal display element as in claim 1, wherein the electrophoretic nanoparticles within the LC medium may comprise up to approximately 10% of the medium.

8. A bistable liquid crystal display element as in claim 1, wherein the first and second in-plane electrodes are interdigitally configured on the display element substrate.

9. A bistable liquid crystal display element as in claim 1, further comprising polymer beads embedded in the LC ranging up to 10 microns in size.

10. A bistable liquid crystal display element as in claim 1, further comprising in-plane electrodes having a tall aspect ratio as compared to the display element configured to collect charged electrophoretic nanoparticles on a single surface of an electrode.

* * * * *